United States Patent [19]
Neal et al.

[11] Patent Number: 5,557,981
[45] Date of Patent: Sep. 24, 1996

[54] ONE-PIECE GEARSHIFT LEVER WITH COLD FORMED END

[75] Inventors: Leonard Neal, Windsor; Robert Elliott, Tecumseh, both of Canada

[73] Assignee: Tamco Limited, Ontario, Canada

[21] Appl. No.: 66,972

[22] Filed: May 25, 1993

[51] Int. Cl.$^6$ ............................. F16H 59/10; B21C 1/24
[52] U.S. Cl. ............................. 74/523; 72/283; 74/473 R
[58] Field of Search ..................... 74/523, 543, 473 P, 74/473 R; 72/356, 367, 283; 200/61.88

[56] References Cited

U.S. PATENT DOCUMENTS

| | | | |
|---|---|---|---|
| 1,254,349 | 1/1918 | Patch | 200/61.88 |
| 1,911,322 | 5/1933 | Murray et al. | 74/473 P |
| 2,049,145 | 7/1936 | Warren et al. | 74/543 X |
| 2,272,897 | 2/1942 | Riesing . | |
| 2,945,100 | 7/1960 | Maurice et al. | 200/61.88 |
| 2,953,674 | 9/1960 | Grodt . | |
| 3,709,020 | 1/1973 | Evans | 72/283 |
| 3,742,204 | 6/1973 | Price | 74/523 X |
| 3,790,729 | 2/1974 | Bradshaw | 200/61.88 |
| 3,798,943 | 3/1974 | Benteler et al. | 72/43 |
| 4,057,992 | 11/1977 | Willimzik | 72/283 |
| 4,148,207 | 4/1979 | Stump | 72/283 |
| 4,161,112 | 7/1979 | Stump | 72/283 |
| 4,162,384 | 7/1979 | Chicoine | 200/61.88 |
| 4,183,424 | 1/1980 | Rumyantsev et al. | 200/61.88 X |
| 4,473,318 | 9/1984 | Schrock . | |
| 4,603,598 | 8/1986 | Tsuji et al. | 74/523 X |
| 4,622,840 | 11/1986 | Diffenderfer et al. | 72/283 |
| 4,726,211 | 2/1988 | Sunaga et al. | 72/283 |
| 4,734,981 | 4/1988 | Zuenej | 29/868 |
| 4,794,812 | 1/1989 | Tanaka | 74/523 X |
| 4,822,962 | 4/1989 | MacCourt | 200/61.88 |
| 4,850,238 | 7/1989 | Inoue | 74/473 |
| 4,854,148 | 8/1989 | Mayer | 72/68 |
| 4,909,056 | 3/1990 | Ragettli | 72/91 |
| 4,915,166 | 4/1990 | Cunningham et al. | 165/184 |
| 4,998,429 | 3/1991 | Yamanoi et al. | 72/283 |
| 5,012,888 | 5/1991 | MacInnis | 74/473 R X |
| 5,033,324 | 7/1991 | Glaser | 74/473 R |
| 5,125,280 | 6/1992 | Koscinski et al. | 74/89.15 |
| 5,172,603 | 12/1992 | MacInnis | 74/473 R X |

FOREIGN PATENT DOCUMENTS

| | | |
|---|---|---|
| 315792 | 10/1931 | Canada . |
| 838757 | 4/1970 | Canada . |
| 2003963 | 5/1990 | Canada . |
| 0443992 | 8/1991 | European Pat. Off. . |
| 2071184 | 9/1971 | France . |
| 633119 | 11/1982 | Switzerland . |
| 252291 | 5/1926 | United Kingdom . |
| 2191965 | 12/1987 | United Kingdom . |
| WO9102912 | 3/1991 | WIPO . |

*Primary Examiner*—Rodney H. Bonck
*Attorney, Agent, or Firm*—Vickers, Daniels & Young

[57] ABSTRACT

A gearshift lever and a method of forming the lever is disclosed. The lever includes a one-piece shaft with a functional end and an operative end, the functional end being cold formed to a specific configuration for mechanical cooperation with components auxiliary to the lever. A channel region is provided along the shaft between the functional and operative ends for running electrical wire between the functional and operative ends, and a shaft covering material surrounds the channel region for containing the electrical wire within the channel region. The cold forming of the functional end of the lever reduces the cost of manufacturing the lever. In an alternative embodiment, the shaft of the lever is provided with a hollow bore along the length of the shaft for enclosing the wires.

5 Claims, 5 Drawing Sheets

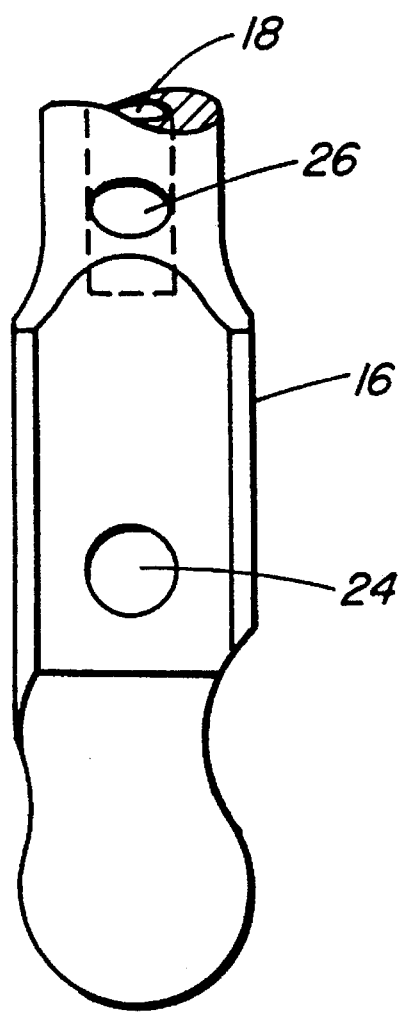
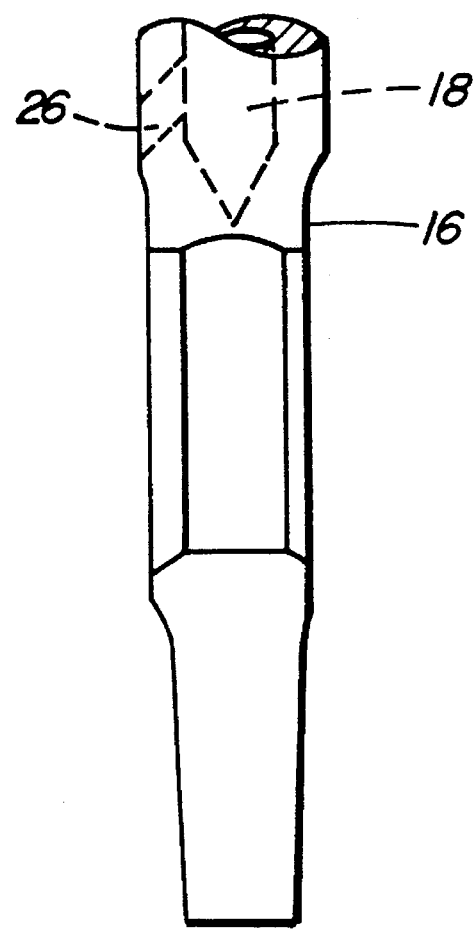
FIG. 3
FIG. 4

ONE-PIECE GEARSHIFT LEVER WITH COLD FORMED END

FIELD OF THE INVENTION

This invention relates to gear shift levers and specifically to levers having a cold formed functional end. The invention also relates to gearshift levers with a channel along the length of the lever for receiving and enclosing wires therein.

BACKGROUND OF THE INVENTION

In the past, there has been a need for a one-piece gearshift lever that is simple and inexpensive to manufacture through cold forming of the functional end of the lever. There has also been a need for a lever formed by this method that enables wires to run along the length of lever between the knob or operative end and the functional end of the lever to enable an electrical switch to be positioned at the operative end of the lever for actuation of an electrical system, for example, an overdrive system.

Past methods of forming gearbox levers with wires along the length of the lever have included drilling the centre of a piece of steel which further requires subsequent deburring operations to reduce the risk of wear on the wire by metal burrs created during drilling. Other methods of forming gearshift levers have included complex welding operations. These operations also add to the cost of manufacturing.

U.S. Pat. No. 4,162,384 discloses an electrical switch mounted on a knob, with the switch terminal connected to wires which extend down the exterior of the gearshift stick. This patent shows a wire extending within the protective sleeve and over the shift stick. In another embodiment, this patent also shows a wire extending down the hollow interior of stick exiting at the bottom through a slot.

This patent does not disclose a gearshift lever made of a one piece formed metal tube in combination with a cold formed linkage end which is formed to a specific shape. In addition, where the wire extends under a protective sleeve this patent does not disclose a slot through which the electrical wire runs from the switch to the linkage end, running axially along the length of the gearshift lever.

PCT International Application No. WO 91/02912 discloses a lever consisting of a cylindrical pipe inserted in a cavity of a knob. A contact element is part of an electrical switch in the lever and the knob is in contact with an isolated connecting lead. The contact is connected to an electrical circuit through a connecting lead. Both the contact element and connecting lead are outside of the cylindrical shaped pipe. This patent does not disclose the running of a connecting lead (wiring) through a cylindrical tube from a switch to a gearshift lever linkage end, or a gearshift lever made of one piece of a formed metal tube in combination with a functional end which is cold formed to a specific shape.

Canadian Patent No. 838,757 discloses an electrical control switch movably mounted on an actuating lever having a tubular housing member within which is located a contact assembly. The end of the lever is received within the wire receiving passage of a housing member and lead wires pass through the lever, from the steering column, to a passage for connection to the terminal end of the contact members of the assembly. This patent does not disclose a gearshift lever made of one piece of a formed metal tube, in combination with a functional end which is cold formed to a specific shape.

SUMMARY OF THE INVENTION

In accordance with the invention, a gearshift lever is provided comprising a one-piece shaft with a functional end and an operative end where the functional end is cold formed to a specific configuration for mechanical cooperation with components auxiliary to the lever, a channel region along the shaft between the functional and operative ends for running electrical wire between the functional and operative ends, and shaft covering material surrounding the channel region for containing the electrical wire within the channel region.

In an alternative embodiment, the gear shift lever is a one-piece metal tube with a functional end and an operative end where the functional end is cold formed to a specific configuration for mechanical cooperation with components auxiliary to the lever, and the tube also provides for the running of electrical wire between the functional end and the operative end.

BRIEF DESCRIPTION OF THE DRAWINGS

The invention is illustrated by way of example in the accompanying drawings in which:

FIG. 3 is a side elevation view of the functional end of the shaft as seen along the line 3—3 of FIG. 1;

FIG. 4 is an end elevation view of the functional end of the shaft shown in FIG. 3;

DETAILED DESCRIPTION OF A PREFERRED EMBODIMENT

Figure 1:
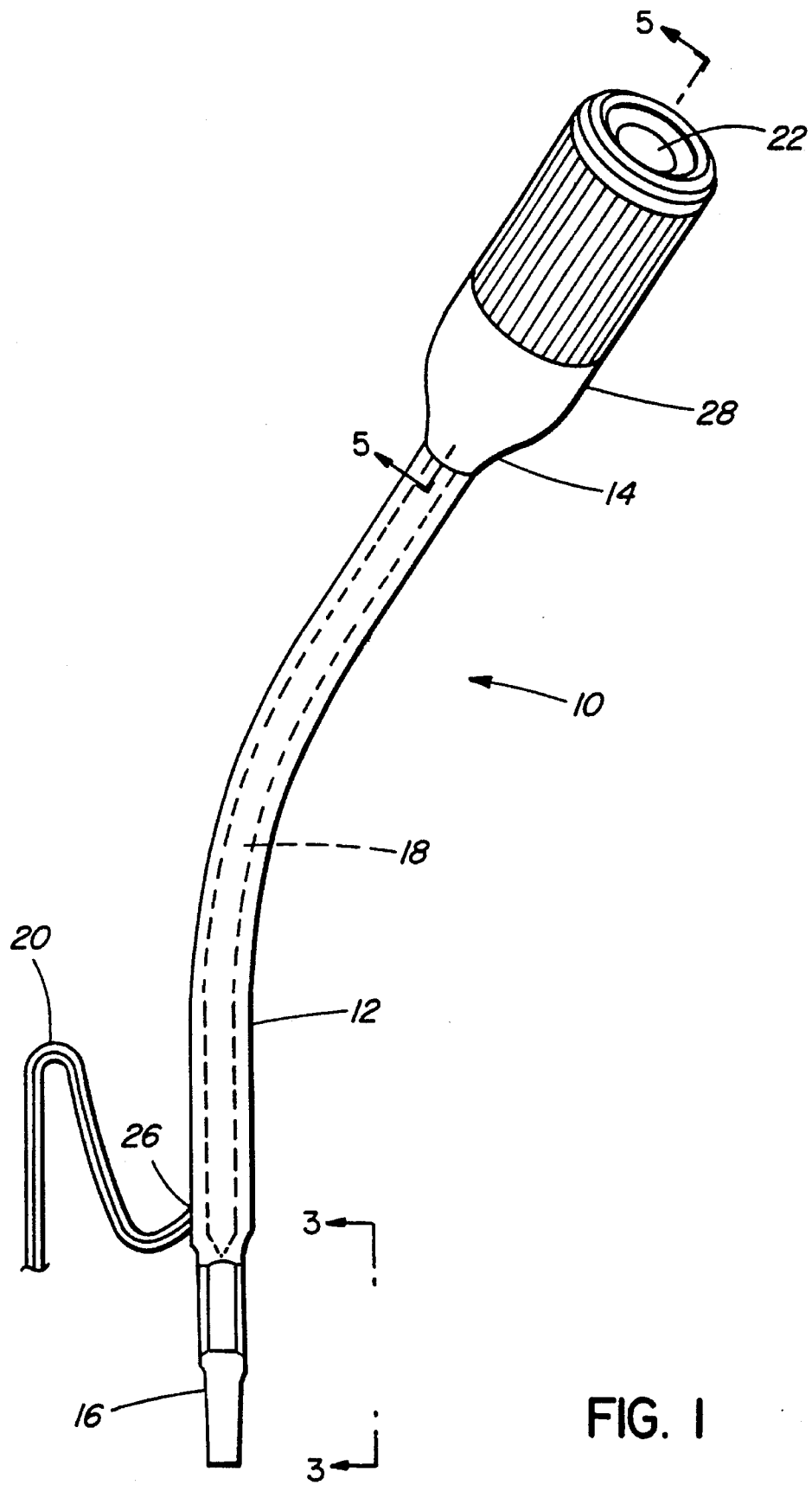
FIG. 1 is a perspective view of a preferred embodiment of the invention.

Referring to FIG. 1, a gearshift lever 10 is shown having an elongated, contoured shaft 12, an operative end 14 including a knob portion 28 and a functional end 16.

Figure 2:
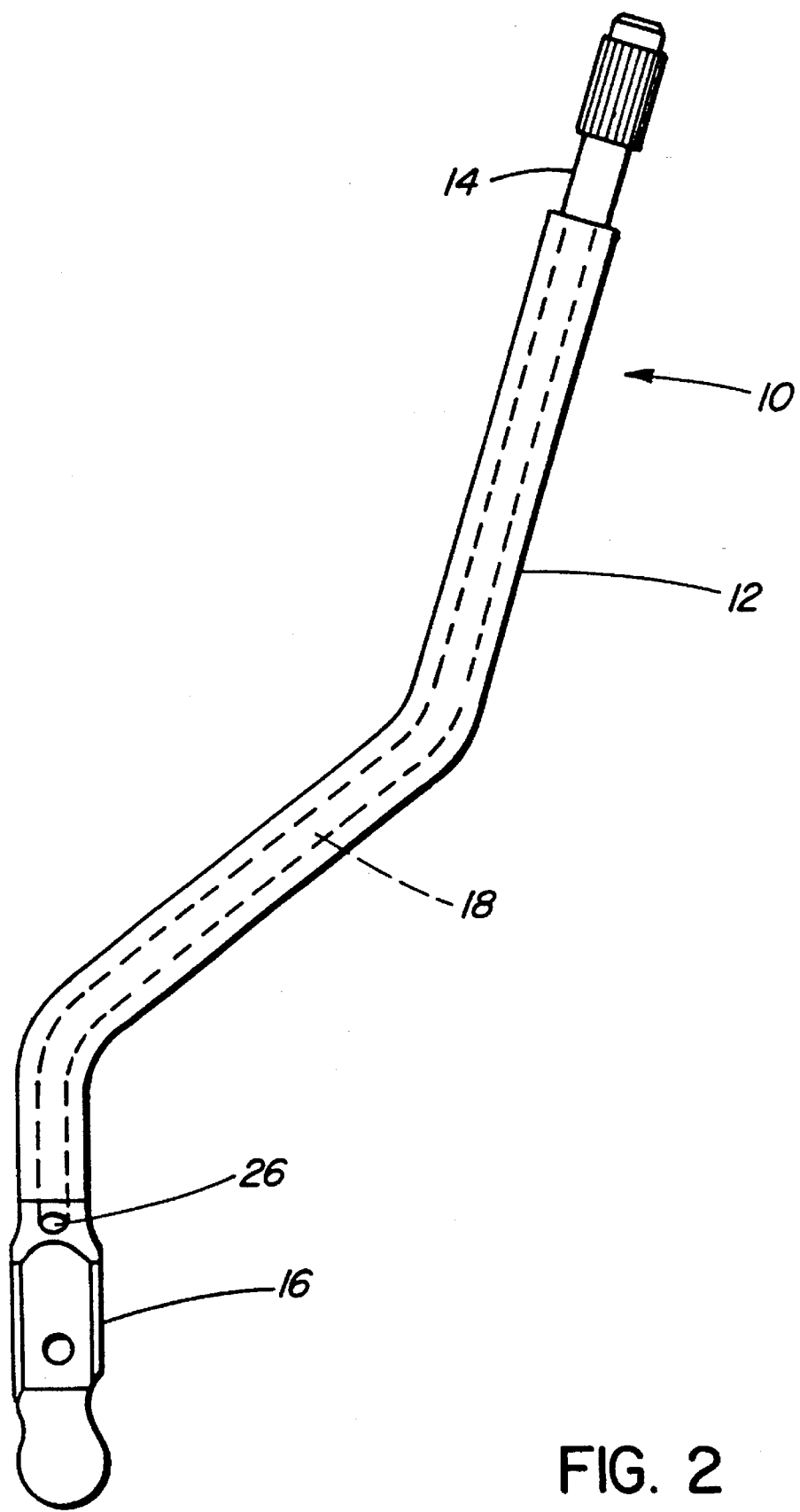
FIG. 2 is a cross-sectional view of the shaft with the knob removed from the operative end.

Shaft 12 may be of relatively small diameter, thick wall steel tubing drawn over a mandrel (DOM tubing). The shaft 12 is provided with an internal channel 18 formed during the drawing process and extending between the functional end 16 and operative end 14 of the shaft 12. The internal channel 18 is also provided with an exit orifice 26 which may be positioned at the junction between the functional end 16 and the shaft 12 or alternatively, along shaft 12 or within functional end 16. Shaft 12 may be either straight or curved in shape depending on the styling requirements of the vehicle concerned as shown in FIG. 2.

The functional end 16 is cold formed to a desired shape for mechanical cooperation with components auxiliary to the gearshift lever 10, for example a manual or automatic gearbox. Cold forming involves squeezing the tubing to form an end of a specific shape. The procedure of cold forming the functional end 16 is less expensive than broaching operations typically employed in producing gearbox levers. The particular configuration of the functional end 16 may be one of a variety of shapes depending upon the specific linkage desired. The cold forming process results in functional end 16 which may be of narrower or wider dimensions relative to the shaft 12 diameter as shown in FIGS. 3 and 4. A bore 24 (FIG. 3) may be subsequently milled in the functional end 16 if desired.

Figure 5:
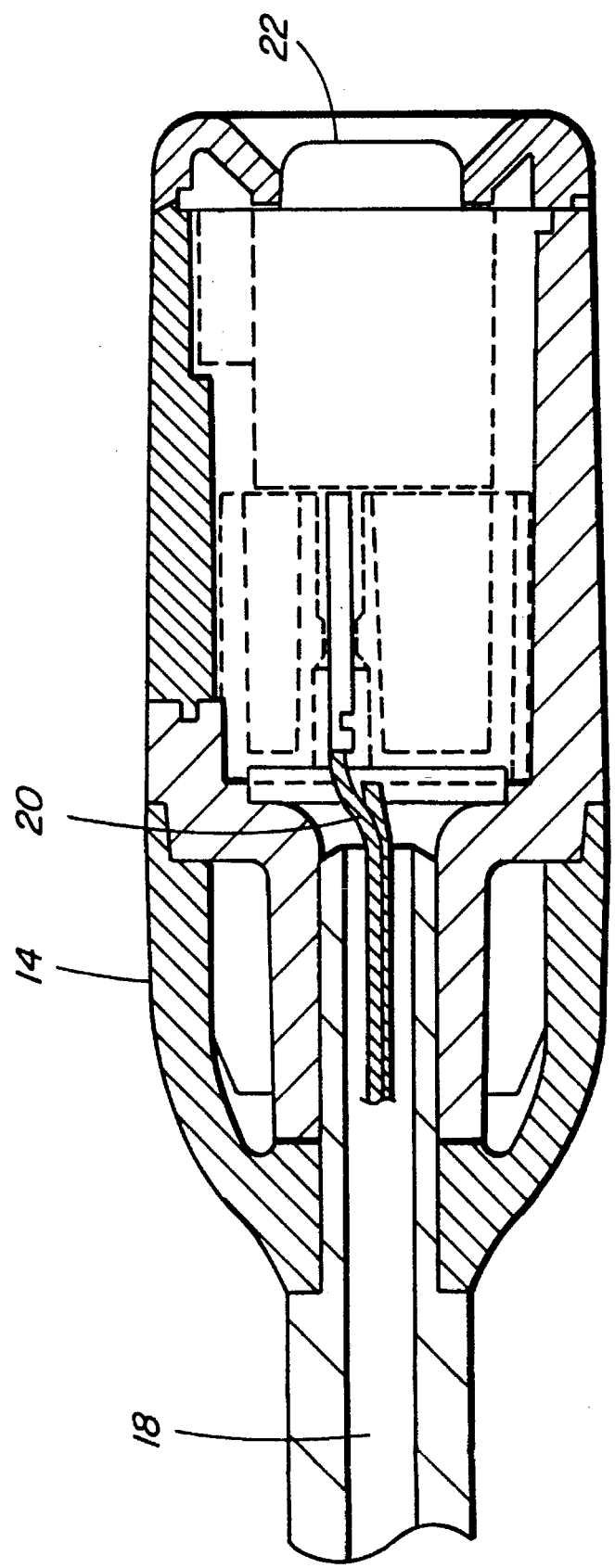
FIG. 5 is a cross-sectional view as seen along line 5—5 of FIG. 1 showing the knob and operative end and its attachment to the shaft.

The operative end 14 of the shaft 12 is adapted for attachment of a knob portion 28 which may be attached thereto by a press-fit or by any suitable method to the operative end 14. Knob portion 28 is of a larger diameter than shaft 12 and contoured in order to facilitate manual grasping thereof for operation and control of the lever 10. Knob portion 28 is also provided with a push-button switch 22, electrically connected to wires 20 passing through channel 18 and the knob portion 28 as shown in FIG. 5.

Figure 6:
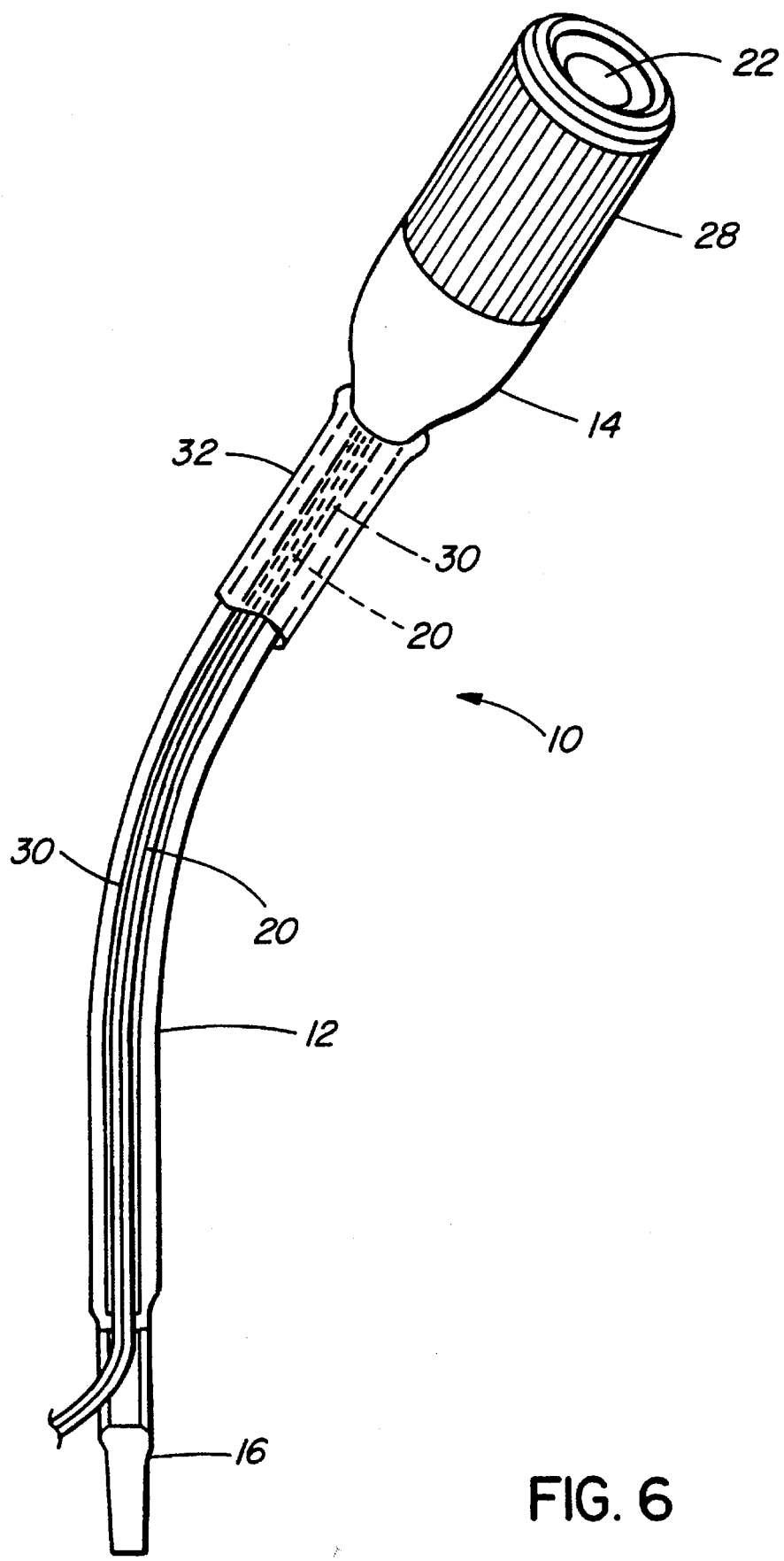
FIG. 6 is a perspective view of another embodiment of the invention showing the heat shrink cover in partial cutaway.

In another embodiment of the invention, shaft 12 may be formed of a solid rod of steel with a channel 30 milled along the length of the shaft 12 as shown in FIG. 6. Wires 20 are passed from the functional end 16 to the operative end 14 through the channel 30. A suitable shaft covering material 32 is applied over the shaft 12 to contain the wires 20 within channel 30. Shaft covering material 32 is preferably a single tube of heat shrinkable material or another suitable material such as a tape.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the claims.

The embodiments of the invention in which an exclusive property or privilege is claimed are defined as follows:

1. A one-piece gearshift lever comprising a mandrel drawn metal tube having a tubular outer operative end and a cold formed solid inner functional end, said inner end having a contour for mechanical cooperation with components auxiliary to the lever.

2. The gearshift lever of claim 1, wherein there is a junction between said tubular end and said solid end, an orifice located at the junction, and electrical wiring extending through said tubular outer operative end and exiting through said orifice.

3. The gearshift lever of claim 2, further including electrical actuating means on said outer operative end and connected to said wiring.

4. A method of manufacturing a one-piece gearshift lever having a mandrel drawn metal tube with an outer operative end and a cold formed inner functional end for mechanical cooperation with components auxiliary to the lever; said method comprising the steps of:

a) drawing a small diameter, thick-walled steel tubing over a mandrel to define a conduit having opposite ends;

b) cold forming one of said ends to provide a flat functional end; and c) machining a portion of said functional end to a contour for mechanical cooperation with components auxiliary to the lever.

5. The method of claim 4 including the further steps of:

d) milling an exit orifice through said conduit adjacent said cold formed end; and e) passing wiring through said conduit for said wiring to extend through said operative outer end and said orifice.

* * * * *